US009323987B2

(12) United States Patent
Lee et al.

(10) Patent No.: US 9,323,987 B2
(45) Date of Patent: Apr. 26, 2016

(54) APPARATUS AND METHOD FOR DETECTING FORGERY/FALSIFICATION OF HOMEPAGE

(71) Applicant: ELECTRONICS AND TELECOMMUNICATIONS RESEARCH INSTITUTE, Daejeon (KR)

(72) Inventors: Taek kyu Lee, Daejeon (KR); Geun Yong Kim, Daejeon (KR); Seok won Lee, Daejeon (KR); Myeong Ryeol Choi, Daejeon (KR); Hyung Geun Oh, Daejeon (KR); KiWook Sohn, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 33 days.

(21) Appl. No.: 14/467,677

(22) Filed: Aug. 25, 2014

(65) Prior Publication Data

US 2015/0139539 A1     May 21, 2015

(30) Foreign Application Priority Data

Nov. 18, 2013    (KR) .................. 10-2013-0140034

(51) Int. Cl.
*G06K 9/62*      (2006.01)
*G06K 9/00*      (2006.01)
*G06K 9/34*      (2006.01)
*G06K 9/72*      (2006.01)

(52) U.S. Cl.
CPC ............ *G06K 9/00469* (2013.01); *G06K 9/344* (2013.01); *G06K 9/723* (2013.01); *G06K 2209/01* (2013.01)

(58) Field of Classification Search
None
See application file for complete search history.

(56) References Cited

U.S. PATENT DOCUMENTS

| 8,205,255 | B2* | 6/2012 | Benea | ..................... G06F 21/64 713/194 |
| 2008/0046738 | A1* | 2/2008 | Galloway | ............ H04L 63/1483 713/176 |
| 2012/0023566 | A1* | 1/2012 | Waterson | ................ G06F 21/56 726/9 |

FOREIGN PATENT DOCUMENTS

| KR | 10-2008-0048159 A | 6/2008 |
| KR | 10-0867306 B1 | 11/2008 |
| WO | 2008/066281 A1 | 6/2008 |

* cited by examiner

*Primary Examiner* — Brian P Werner
(74) *Attorney, Agent, or Firm* — LRK Patent Law Firm (57) ABSTRACT

An apparatus and method for detecting forgery/falsification of a homepage. The apparatus includes a homepage image shot generation module for generating homepage image shots of an entire screen of an accessed homepage. A character string extraction module extracts character strings from each homepage image shot using an OCR technique. A character string comparison module compares each of the extracted character strings with character strings required for determination of homepage forgery/falsification, thus determining whether the extracted character string is a normal character string or a falsified character string. A homepage falsification determination module determines whether the corresponding homepage has been forged/falsified, based on results of the comparison. A character string learning module learns the character string extracted from the homepage image shot, based on results of the determination, and classifies the character string as the normal character string or the falsified character string.

11 Claims, 4 Drawing Sheets

APPARATUS AND METHOD FOR DETECTING FORGERY/FALSIFICATION OF HOMEPAGE

CROSS REFERENCE TO RELATED APPLICATION

This application claims the benefit of Korean Patent Application No. 10-2013-0140034, filed Nov. 18, 2013, which is hereby incorporated by reference in its entirety into this application.

BACKGROUND OF THE INVENTION

1. Technical Field

The present invention relates generally to an apparatus and method for detecting the forgery/falsification of a homepage and, more particularly, to an apparatus and method for detecting the forgery/falsification of a homepage, which can promptly and precisely detect the behavior of forging/falsifying a homepage via the hacking of a website.

2. Description of the Related Art

Technology for detecting the behavior of illegally forging/falsifying a homepage via the hacking of a website is problematic in that false positive alarms for identifying even a normal dynamic variation in a target homepage, such as the posting, of writings by a user and a manager on a board and the updating of data by the manager, as forgery/falsification frequently occur in the target homepage.

Conventional technology is configured to periodically crawl source codes (html) constituting a homepage, compare homepage sources which are immediately previously collected, with character codes, display the degree of a chance in the homepage source codes by a percentage change rate, and determine the homepage to be forged/falsified according to the change rate of the source codes of the homepage in order to detect the forgery/falsification of a homepage performed via hacking. However, there are disadvantages in that, due to the posting of writings on a homepage hoard or the uploading of an image file by normal users, the change rate in homepage source codes (html) increases, and a change rate enabling the forgery/falsification of a homepage to be identified is vague, thus making it impossible to precisely detect the forgery/falsification homepage.

Further, among conventional technologies, there is technology for continuously learning and analyzing a dynamic area and a static area by utilizing a masking technique in an image analysis technique and determining whether a homepage has been falsified based on the results of analysis. However, such a technology is disadvantageous in that, when only part of a homepage other than the entirety of the homepage is falsified due to hacking, that is, when only a partial region belonging to a dynamic area is falsified, it is impossible to detect such falsification. Such partial falsification of a dynamic area is such an intelligent method that it is used for the forgery/falsification of the governmental homepages of countries and public institutions, and is a method difficult to automatically detect using current technology.

As related preceding technology, Korean Patent No. 0867306 (entitled "Homepage-falsification inspection system and method using an image analysis technique") discloses technology for installing a falsification detection system in the personal computer (PC) of a detector so as to detect whether a target website operation has been falsified and continuously monitoring the target website, thus determining whether the target website has been falsified.

The invention disclosed in Korean Patent No. 867306 is configured to distinguish the static area of a web nags from a dynamic area frequently changed by a user via a forward masking analysis technique and a reverse masking analysis technique by applying an image analysis technique to a homepage. This technology determines whether a homepage has been falsified using masking indices indicating locations divided into the static area and the dynamic area of the webpage. Therefore, it is possible to detect only the forgeries/falsifications exceeding the reference values of masking indices of the static and dynamic areas of the homepage. That is, it may be difficult to detect the falsification of a partial area such as the falsification of a small image file in a homepage.

SUMMARY OF THE INVENTION

Accordingly, the present invention has been made keeping in mind the above problems occurring in the prior art, and an object of the present invention is to provide an apparatus and method for detecting the forgery/falsification of a homepage, which can determine the behavior of forgery/falsification a homepage using a scheme for continuously extracting character strings from image shots, generated from a target website screen, via an Optical Character Recognition (OCR) technique and a scheme for comparing the character strings with keywords.

In accordance with an aspect of the present invention to accomplish the above object, there is provided an apparatus for detecting forgery/falsification of a homepage, including a homepage image shot generation module for generating homepage image shots of an entire screen of an accessed homepage; a character string extraction module for extracting character strings from each homepage image shot using an Optical Character Recognition (OCR) technique a character string comparison module for comparing each of the extracted character strings with character strings required for determination of homepage forgery/falsification, thus determining whether the extracted character string is a normal character string or a falsified character string; a homepage falsification determination module for determining whether the corresponding homepage has been forged/falsified, based on results of the comparison by the character string comparison module; and a character string learning module for learning the character string extracted from the homepage image shot, based on results of the determination by the homepage falsification determination module, and classifying the character string as the normal character string or the falsified character string.

The character string comparison module may include a normal character string comparison module for comparing the character string extracted from the homepage image shot with normality determination reference character strings among the character strings required for determination of homepage forgery/falsification; and a falsified character string comparison module for comparing the character string extracted from the homepage image shot with falsification determination reference character strings among the character strings required for determination of homepage forgery/falsification.

The homepage falsification determination module may be configured to determine whether the corresponding homepage has been forged/falsified, depending on whether the character string extracted from the homepage image shot is identical to any of falsification determination reference character strings, and determine whether the homepage is in a normal state if a rate at which the character string extracted from the homepage image shot is identical to any of normality determination reference character strings is high.

The apparatus may further include a normality determination reference character string management database (DB) for previously storing normal character strings that are normality determination references, and storing normality determination reference character strings that are collected via learning as the normal character strings; and a falsification determination reference character string management DB for previously storing falsified character strings that are falsification determination references, and storing falsification determination reference character strings that are collected via learning, as the falsified character strings.

The character string comparison module may arrange and use normal character strings invoked from the normality determination reference character string management DB in a comparison sequence in which weights corresponding to character strings continuously detected from existing homepages, a number of repetitions of character strings, or words designated by a user are taken into consideration.

The character string comparison module may arrange and use falsified character strings invoked from the falsification determination reference character string management DB in a comparison sequence in which importance levels and influence levels of homepage forgery/falsification incidents, targets of homepage forgery/falsification, presence or non-presence of specific purpose and organized behavior, character strings used in the forgery/falsification of other homepages, a number of repetitions of the character strings, or the user's character strings of interest are taken into consideration.

The character string learning module may be configured to, as the corresponding homepage is determined by the homepage falsification determination module to be in a forged/falsified state, register the character string extracted from the corresponding homepage image shot using the OCR technique as a falsified character string, and assign a weight to the registered falsified character string depending on importance levels of character strings defined by the user.

The character string learning module may be configured to, as the corresponding homepage is determined by the homepage falsification determination module to be in a normal state, register the character string extracted from the corresponding homepage image shot using the OCR technique as a normal character string, and assign a weight to a character string repeatedly appearing with respect to character strings extracted from previous image shots.

In accordance with another aspect of the present invention to accomplish the above object, there is provided a method for detecting forgery/falsification of a homepage, including generating, by a homepage image shot generation module, homepage image shots of an entire screen of an accessed homepage; extracting, by a character string extraction module, character strings from each of the generated homepage image shots using an Optical Character Recognition (OCR) technique; comparing, by a character string comparison module, each of the extracted character strings with character strings required for determination of homepage forgery/falsification, thus determining whether the extracted character string is a normal character string or a falsified character string; determining, by a homepage falsification determination module, whether the corresponding homepage has been forged/falsified, based on results of the comparison; and learning, by a character string learning module, the character string extracted from the homepage image shot, based on results of determining whether the corresponding homepage has been forged/falsified, and classifying, by the character string learning module, the character string as the normal character string or the falsified character string.

Comparing each of the extracted character strings may include comparing the character string extracted from the homepage image shot with normality determination reference character strings among the character strings required for determination of homepage forgery/falsification; and comparing the character string extracted from the homepage image shot with falsification determination reference character strings among the character strings required for determination of homepage forgery/falsification.

Determining whether the corresponding homepage has been forged/falsified may include determining whether the corresponding homepage has been forged/falsified, depending on whether the character string extracted from the homepage image shot is identical to any of falsification determination reference character strings, and determining whether the homepage is in a normal state if a rate at which the character string extracted from the homepage image shot is identical to any of normality determination reference character strings is high.

Classifying the character string may include, as the corresponding homepage is determined to be in a forged/falsified state, registering the character string extracted from the corresponding homepage image shot using the OCR technique as a falsified character string; and assigning a weight to the registered falsified character string depending on importance levels of character strings defined by the user.

Classifying the character string may include, as the corresponding homepage determined to be in a normal state, registering the character string extracted from the corresponding homepage image shot using the OCR technique as a normal character string; and assigning a weight to a character string repeatedly appearing with respect to character strings extracted from previous image shots.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is characterized in that, in order to immediately detect the forgery/falsification of a homepage caused by the hacking of a website, homepage is accessed and a homepage screen is stored in the form of images (image shots), and an Optical Character Recognition (OCR) technique is applied to the stored images to extract character strings present in the image shots, and then the extracted character strings are compared to character strings frequently used in falsification, thus promptly and precisely identifying the behavior of forging/falsifying a homepage.

Accordingly, in the following specification of the present invention, there will be described a method of shortening a detection time and improving a true positive alarm rate by automating the identification of the forgery/falsification of a homepage caused by hacking using a scheme for storing homepage image shots and a scheme for comparing character strings, which are extracted via an OCR technique for recognizing characters present in image shots, with keywords frequently used in homepage forgery/falsification, in order to improve the detection rate of homepage forgery/falsification caused by hacking.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, arts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings, in the following description of the present invention, the same reference numerals are used to designate the same or similar elements throughout the drawings and repeated descriptions of the same components will be omitted.

Figure 1:
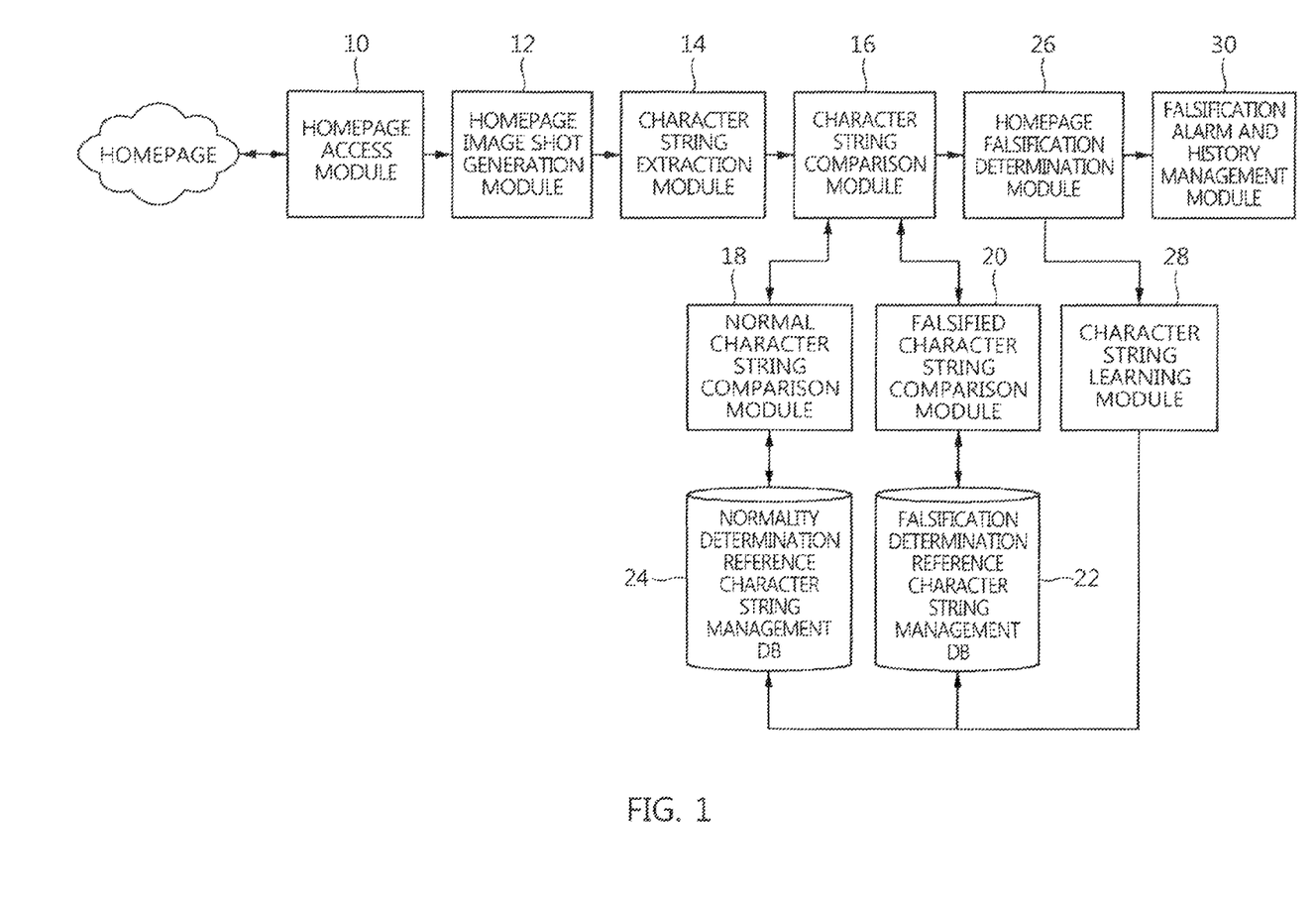
FIG. 1 is a block diagram showing the configuration of an apparatus far detecting the forgery/falsification of a homepage according to an embodiment of the present invention.

FIG. 1 is a block diagram showing the configuration of an apparatus for detecting the forgery/falsification of a homepage according to an embodiment of the present invention.

The apparatus shown in FIG. 1 includes a homepage access module 10, a homepage image shot generation module 12, a character string extraction module 14, a character string comparison module 16, a normal character string comparison module 18, a falsified character string comparison module 20, a falsification determination reference character string management database (DB) 22, a normality determination reference character string management DB 24, a homepage falsification determination module 26, a character string learning module 28, and is falsification alarm and history management module 30.

The homepage access module 10 functions to sequentially access target websites of homepage forgery/falsification monitoring either at regular periods or at irregular periods.

The homepage image shot generation module 12 captures the entire screen of each homepage accessed by the homepage access module 10 and then generates homepage image shots having image file formats.

The character string extraction module 14 recognizes and extracts character strings using an OCR technique from each homepage image shot generated by the homepage image shot generation module 12.

The character string comparison module 16 compares each character string extracted by the character string extraction module 14 with character strings managed and stored to determine the forgery/falsification of a homepage.

The normal character string comparison module 18 compares character strings, which are collected by monitoring target websites homepage forgery/falsification monitoring and which enable a normal state to be identified, with each character string in a current homepage image shot extracted by the character string extraction module 14.

The falsified character string comparison module 20 compares malicious (falsified) character strings, which are extracted from a website for providing previous homepage hacking history information or hacked homepage screen information, or keywords which are personally entered by the user, with each character string in a current homepage image shot extracted by the character string extraction module 14.

In FIG. 1, although the character string comparison module 16, the normal character string comparison module 18, and the falsified character string comparison module 20 are shown as independent modules, the normal character string comparison module 18 and the falsified character string comparison module 20 may be included in the character string comparison module 16.

The falsification determination reference character string management DB 22 collects falsified character strings extracted from each homepage image shot, and stores new falsified character strings learned by the character string learning module 28. Here, since the falsified character strings are character strings that are references for the determination of falsification, they may be referred to as "falsification determination reference character strings."

The normality determination reference character string management DB 24 collects normal character strings extracted from each homepage image shot, and stores new normal character strings learned by the character string learning module 28. Here, since normal character strings are character strings that are references for the determination of normality, they may be referred to as "normality determination reference character strings."

The homepage falsification determination module 26 aggregates the results of comparison between character strings extracted from the homepage image shot and normal character strings and falsified character strings, and then determines whether the corresponding homepage has been falsified.

The character string learning module 28 learns the character strings from the homepage image shot based on the results of the determination by the homepage falsification determination module 26, and classifies the character strings as normal character strings or falsified character strings. Preferably, the character string learning module 28 learns normal character strings, which are usually and frequently used, among character strings collected via the monitoring of a website corresponding to the target of homepage forgery/falsification monitoring, and is then capable of collecting homepage normality determination information. Further, the character string learning module 28 learns falsified character strings, which are extracted from the website for providing image information used in the forgery/falsification of a homepage via hacking, and is then capable of collecting homepage forgery/falsification determination information.

The falsification alarm and history management module 30 represents the current situation of an alarm and history management for the results of homepage forgery/falsification using a user interface (Graphical User Interface: GUI) depending on the results of the determination by the homepage falsification determination module 26. That is, if a character string extracted from a homepage image shot is identical to a keyword (that is a falsified (malicious) character string), it is determined that the homepage has been falsified, and thus the falsification alarm and history management module 30 notifies the user of the falsification of the homepage using an alarm. Further, the falsification alarm and history management module 30 continuously stores analysis results in a falsification inspection history DB (not shown), and thus also supports a history inquiry function. Although not shown in FIG. 1, the above-described falsified inspection history DB may be understood to be included in the falsification alarm and history management module 30 or to be connected to the falsification alarm and history management module 30.

In accordance with the above configuration, when a plurality of websites corresponding to the targets of homepage forgery/falsification monitoring are registered via the user interface (GUI) for performing the management of registration, revision, and deletion of homepages, the respective homepages are sequentially accessed via the homepage access module 10 at regular periods or irregular periods based on the input information. Homepage screens of the monitoring targets are captured by the homepage image shot generation module 12, and the sizes, extensions, etc. of stored images are selected, and thus image flies are generated. All character strings present in screen images of the homepages are extracted by the character string extraction module 14 using an OCR technique and are transferred to the character string comparison module 16. The character string comparison module 16 aggregates the results of the comparison by the normal character string comparison module 18 and the falsified character string comparison module 20 and transfers the aggregated comparison results to the homepage falsification determination module 26 so as to determine whether the corresponding homepages have been forged/falsified, based on the character strings extracted from each of the homepage image shots. Here, the normal character string comparison module 18 invokes character swings that are references for determining normality from the normality determination reference character string management DB 24, and compares the invoked character strings with character strings extracted from the homepage image shot. In the same manner, the falsified character string comparison module 20 invokes character strings that are references far determining falsification from the falsification determination reference character string management DB 22, and compares the invoked character strings with character strings extracted from the homepage image shot. The homepage falsification determination module 26 determines whether the corresponding homepage has been forged/falsified, based on the results of determining whether the character strings extracted from the homepage shot are identical to the falsification determination reference character strings and the normality determination reference character strings. When, in the case of falsification determination reference character strings, even a single word is detected as being identical to any of the extracted character strings, the homepage is determined to be forged/falsified. In the case of normality determination reference character strings, even if character strings having the history of being previously continuously and repeatedly detected are re-detected, the corresponding homepage is determined to be normal. If the determination of whether the corresponding homepage has been forged/falsified has been completed, the homepage falsification determination module 26 transfers the results of the determination and the character strings extracted from the homepage image shot to the character string learning module 28. The character string learning module 28 individually classifies the character strings as normal character strings or falsified character strings, and stores them in the normality determination reference character string management DB 24 and the falsification determination reference character string management DB 22. Finally, the falsification alarm and history management module 30 represents the current situation of an alarm and history management for the results of homepage forgery/falsification using the user interface (GUI).

Figure 2:
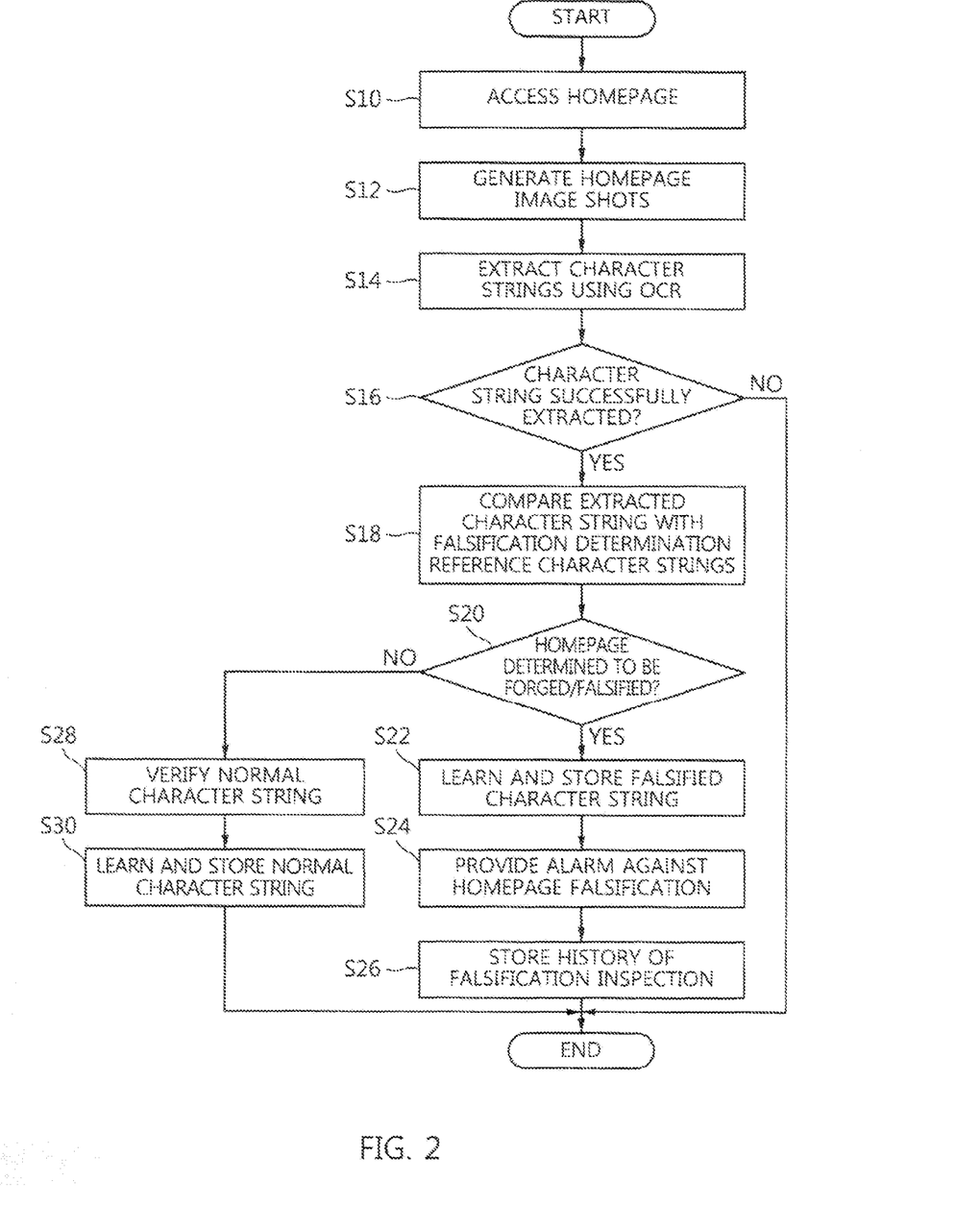
FIG. 2 is a flowchart showing a method for detecting the forgery/falsification of a homepage according to an embodiment of the present invention.

FIG. 2 is a flowchart showing a method for detecting the forgery/falsification of a homepage according to an embodiment of the resent invention.

First, the homepage access module 10 periodically or aperiodically accesses individual homepages, based on a plurality of preregistered homepage forgery/falsification monitoring target websites via the user interface (GUI) for performing the management of registration, revision, and deletion of homepages at step S10.

The homepage image shot generation module 12 generates homepage image shots by accessing the corresponding homepages at step S12.

The character string extraction module 14 extracts a character string inserted into each of the homepage image shots generated by the homepage image shot generation module 12 using an OCR technique from the homepage image shot at step S14.

If there is a character string extracted by the character string extraction module 14 ("Yes" at step S16), the character string is transferred to the character string comparison module 16, whereas if no character string has been extracted, the analysis of the corresponding homepage image shot is terminated.

The character string comparison module 16 determines whether the character string, which is extracted from the homepage image shot and is provided by the character string extraction module 14, is identical to each previously input character string or each falsification determination reference character string collected by the character string learning module 28 so as to determine whether the corresponding homepage has been forged/falsified at step S18.

The homepage falsification determination module 26 determines whether the corresponding homepage has been forged/falsified, depending on whether the character string extracted from the homepage image shot is identical to the falsification determination reference character string at step S20. Depending on whether the homepage has been forged/falsified, a procedure for providing an alarm against the falsification of the homepage and learning a falsified character string, and a procedure for verifying and learning a normal character string are performed.

If it is determined by the homepage falsification determination module 26 that the homepage has been forged/falsified, the character string learning module 28 designates all character strings extracted from the corresponding homepage image shot as falsification determination reference character strings, and stores the character strings in the falsification determination reference character string management DB 22 at step S22, and generates a homepage forgery/falsification alarm.

Accordingly, if it is determined that the homepage has been forged/falsified, the falsification alarm and history management module 30 outputs a homepage falsification alarm via a forgery/falsification determination and history management GUI at step S24, and stores the history of forgery inspection so that the forgery/falsification history of the homepage can be inquired about at step S26.

In contrast, if it is determined by the homepage falsification determination module 26 that the homepage is normal, the character string learning module 28 compares all character strings extracted from the corresponding homepage image shot with normality determination reference character strings, and verifies whether newly detected character strings are normal character strings, via a GUI for displaying each homepage image shot and extracted character strings at step S28, designates the verified newly detected character strings as normality determination reference character strings, stores them in the normality determination reference character string management DB 24, and terminates the procedure for determining homepage forgery/falsification at step S30. The operation of determining whether the homepage is normal will be described in detail below. If a rate at which character strings extracted from the homepage image shot are identical to normality determination reference character strings (that is, repeatedly appearing character strings [in particular, character strings having a high repetition rate] extracted from periodic homepage image shots when the corresponding homepage is in a normal state) is high (the rate of identicalness is obtained by averaging the number of identical character strings via a periodic comparison between character strings), the homepage may be determined to be in a normal state. Here, a case where the rate of identicalness is high may mean a case where the rate of identicalness is higher than a preset threshold when the threshold is preset. The threshold may be variably set. That is, homepage image shots are generated by periodically accessing the homepage, and all character strings are collected using an OCR technique. Further, it is checked whether each of the character strings is repeated, the results of the checking are accumulated, and the repetition rate of each character string is obtained by dividing the number of character strings, repeatedly appearing when character strings are collected from each homepage image shot at each time, by the number of accesses to the homepage. Further, if, compared to the character strings extracted from the homepage, the number of repeatedly appearing character strings exceeds an average value (a reference value), and character strings that have chiefly appeared are detected, the homepage is determined to be normal.

Figure 3:
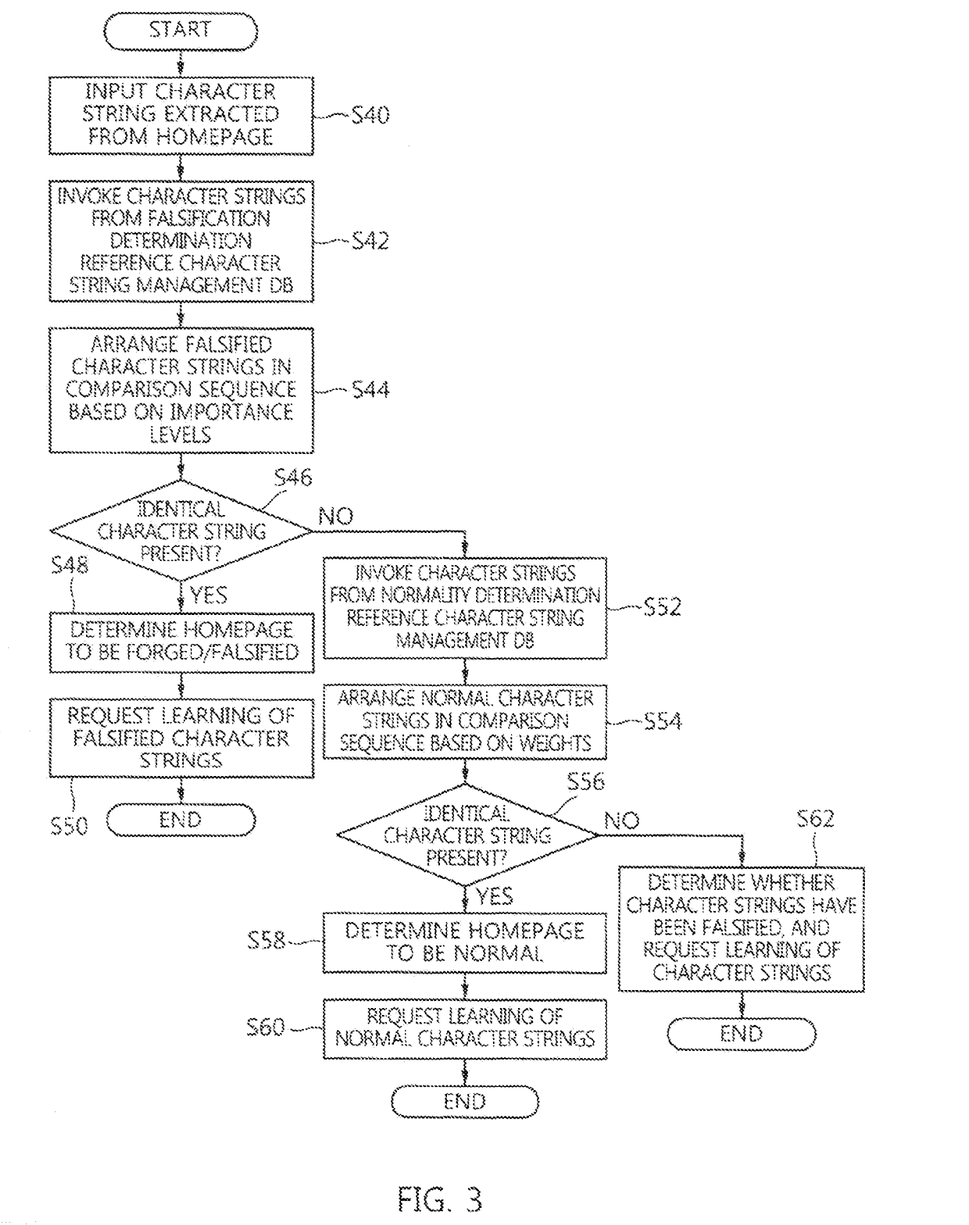
FIG. 3 is a flowchart showing in detail a character string comparison procedure required to detect the forgery/falsification of a homepage according to an embodiment of the present invention.

FIG. 3 is a flowchart showing in detail a character string comparison procedure required to detect the forgery/falsification of a homepage according to an embodiment of the present invention. The following character string comparison procedure may be understood to be performed when the character string comparison module 16 acts as an operation agent.

If a character string extracted from a homepage image shot using an OCR technique is input at step S40, the character string comparison module 16 invokes character strings having a history of being previously used in homepage forgery/falsification due to existing hacking, and character strings that are forgery/falsification determination references from the falsification determination reference character string management DB 22 via the falsified character string comparison module 20 at step S42.

The character string comparison module 16 arranges the invoked character strings (that is, the falsification determination reference character strings (falsified character strings)) in a comparison sequence based on importance levels. For example, the character string comparison module 16 arranges the invoked falsification determination reference character strings in the comparison sequence in consideration of the importance levels and influence levels of homepage forgery/falsification incidents, the targets of homepage forgery/falsification, the presence or non-presence of specific purpose and organized behavior, character strings used in the forgery/falsification of other homepages, the number of repetitions of the character strings, or the user's character strings of interest at step S44.

Although, at the above-described steps S42 and S44, the falsification determination reference character strings are shown as being invoked and then arranged, it is possible to previously arrange the falsification determination references character strings in the comparison sequence, in which the importance levels and influence levels of homepage forgery/falsification incidents, the targets of homepage forgery/falsification, the presence or non-presence of specific purpose and organized behavior, character strings used in the forgery/falsification of other homepages, the number of repetitions of the character strings, or the user's character strings of interest are taken into consideration, and to store the character strings in the falsification determination reference character string management DB 22. In this case, it is also possible for the character string comparison module 16 to sequentially invoke the falsification determination reference character strings previously arranged in the comparison sequence in which importance levels are taken into consideration.

Thereafter, if one or more identical words are detected by performing a comparison between the character strings extracted from the homepage image shot and the falsification determination reference character strings, the homepage is determined to be in a forged/falsified state, whereas if no words are identical to each other, the process proceeds to the step of comparing the extracted character strings with normality determination reference character strings at step S46.

If a word identical to any of the falsification determination reference character strings is detected at step S46, the homepage is determined to be forged/falsified and all character strings extracted from the homepage image shot using the OCR technique are requested to be registered as falsification determination reference character strings from the character string learning module 28 via the homepage falsification determination module 26. Simultaneously with this, the state of homepage forgery/falsification is transferred to the homepage falsification alarm and history management module 30 at step S48.

Further, if a character string enabling homepage forgery/falsification to be determined is detected, the learning of falsified character strings is requested from the character string learning module 28 via the homepage falsification determination module 26 in order to register all character strings extracted from the corresponding homepage image shot as falsification determination reference character strings and store them in the falsification determination reference character string management DB 22 at step S50.

If an identical character string is not present upon comparing the character strings extracted from the homepage image shot with falsification determination reference character strings, normality determination reference character strings are invoked from the normality determination reference character string management DB 24 via the normal character string comparison module 18 so as to determine whether the homepage is normal at step S52.

The character string comparison module 16 arranges the invoked character strings (that is, normality determination reference character strings (normal character strings)) in a comparison sequence based on weights. For example, the character string comparison module 16 arranges the normality determination reference character strings, which are invoked to determine whether the homepage is normal, in the comparison sequence in which weights, such as character strings continuously detected from existing homepages, the number of repetitions of character strings, or words designated by the user, are taken into consideration, at step S54.

Although, at steps S52 and S54, the normality determination reference character strings are shown as being invoked and then arranged, it is possible to previously arrange the normality determination reference character string in the comparison sequence in which weights, such as character strings continuously detected from existing homepages, the number of repetitions of character strings, or words designated by the user, are taken into consideration, and to store the normality determination reference character strings in the normality determination reference character string management DB 24. It is also possible for the character string comparison module 16 to sequentially invoke the normality determination reference character strings previously arranged in the comparison sequence in which the weights are taken into consideration.

Thereafter, the character strings extracted from the homepage image shot are compared with the normality determination reference character strings as to whether an identical character string is present at step S56.

If a plurality of identical words are detected or are repeatedly detected via the comparison at step S56, it is determined that the homepage is in a normal state at step S58, and the process proceeds to the step of learning the normality determination reference character strings at step S60.

In contrast, if an identical word is not present via the comparison at step S56, that is, if an identical character string is not present as a result of the comparison between the character strings extracted from the homepage and the normality determination reference character strings (if the character strings extracted from the homepage are identical to neither the falsification determination reference character strings nor the normality determination reference character strings), it is required to manually analyze whether homepage character strings have been falsified, to thus determine whether the character strings are malicious and request the learning of character strings at step S62.

Figure 4:
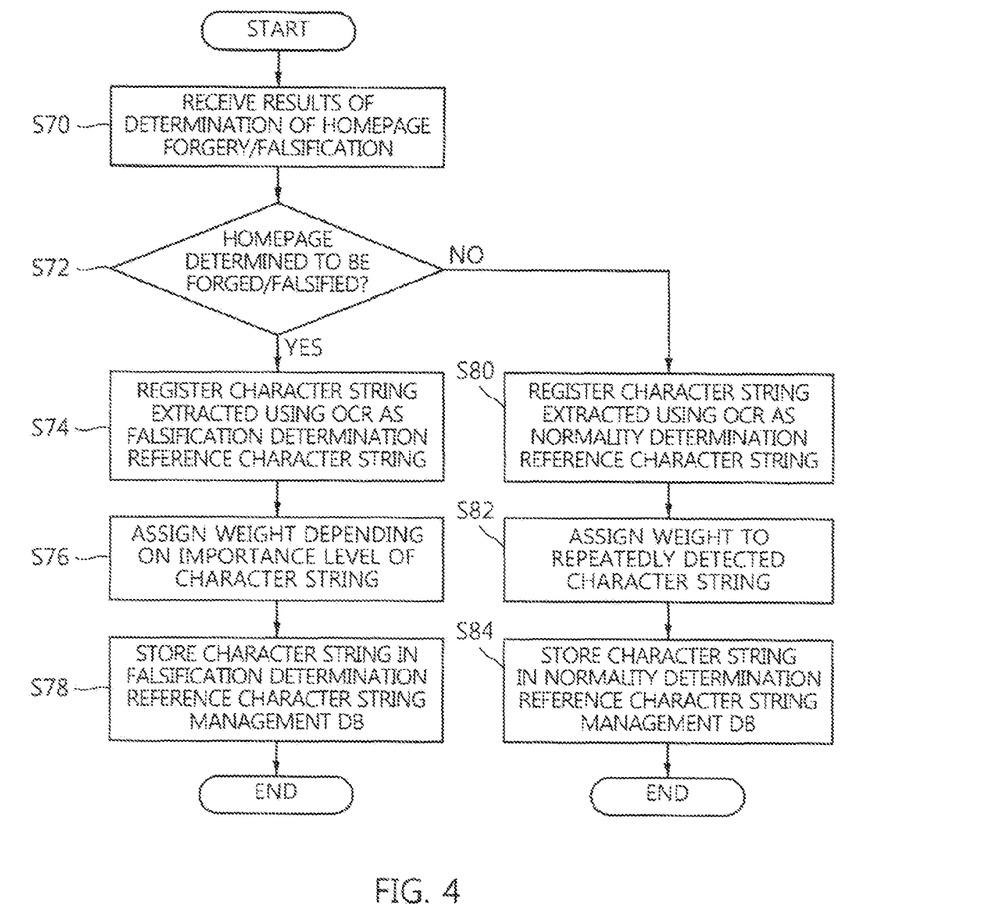
FIG. 4 is a flowchart showing a character string learning procedure used in the detection of the forgery/falsification of a homepage according to an embodiment of the present invention.

FIG. 4 is a flowchart showing a character string learning procedure used in the detection of the forgery/falsification of a homepage according to an embodiment of the present invention. The following character string learning procedure may be understood to be performed when the character string learning module 28 acts as an operation agent.

The homepage forgery/falsification determination module 26 receives the results of a comparison between the character strings from the character string comparison module 16, and determines whether the homepage has been forged/falsified. The character string learning module 28 receives the results of determination of homepage forgery/falsification from the homepage forgery/falsification determination module 26 at step S70.

Thereafter, the character string learning module 28 determines whether the homepage has been forged/falsified at step S72, and performs the following separate procedures for learning, storing, and managing separate character strings for the forgery/falsification state of the homepage and the normal state of the homepage depending on the results of the determination. In other words, the character string learning module 28 stores and learns corresponding character strings as falsification determination reference character strings based on existing homepage hacking history information, websites which provide hacked information, or keywords personally entered by the user.

If the corresponding homepage has been determined to be forged/falsified, each character string extracted from the corresponding homepage image shot using an OCR technique is registered as a falsification determination reference character string at step S74. A weight is assigned to the character string depending on the importance levels of character strings defined by the user at step S76. Finally, the character string with the assigned weight is stored and managed in the falsification determination reference character string management DB 22 at step S78. The weights depending on the importance levels of the character strings may be assigned by digitizing information previously utilized in hacking incidents, hacker-related information, domestic and international cyber terror information, and the importance levels of websites corresponding to the targets of homepage forgery/falsification attacks as scores and assigning the scores to the corresponding character strings as weights.

In contrast, if the corresponding homepage is determined to be in a normal state, the character string extracted from the corresponding homepage image shot using the OCR technique is registered as a normality determination reference character string at step S80, and a weight is assigned to the character string repeatedly appearing with respect to character strings extracted from previous homepage image shots at step S82. The character string with the assigned weight is finally stored and managed in the normality determination reference character string management DB 24 at step S84. Here, the weights depending on the repetition of character strings may be assigned to respective character strings by assigning scores whenever character strings repeatedly appear, upon periodically capturing image shots from a monitoring target homepage and extracting and storing character strings. The scores of weights depending on the repetition of character strings are used to identify that character strings to be subsequently extracted from the homepage image shot are character strings that are normally and frequently used.

As described above, the present invention can periodically access target websites which are monitored for homepage forgery/falsification, store a homepage screen as an image file-format image shot, extract characters present in the stored image shot from the image shot using an OCR technique, and detect the behavior of forging/falsifying a homepage via the character string comparison module 16 and the homepage falsification determination module 26 which are used to identify homepage forgery/falsifications. For this, whether the homepage has been forged/falsified is determined via a comparison between character strings extracted from the homepage image shot using the OCR technique and normality determination reference character strings (white list) and falsification determination reference character strings (black list). The character strings extracted from the target homepage image shot in a normal state using the OCR technique are stored as normality determination reference character strings and managed via the learning of the character strings, and character strings extracted from images uploaded on websites (zone-H or the like), which provide falsified homepage screens, using the OCR technique are stored and managed as falsification determination reference character strings.

Consequently, the present invention may identify the behavior of falsifying homepages by generating homepage image shots, extracting characters present in the image shots using an OCR technique, comparing the extracted characters with user-defined keywords or keywords defined by the learning of character strings. Whether the corresponding homepage has been forged/falsified is determined depending on whether character strings extracted from each homepage image shot are identical to falsification determination reference character strings or normality determination reference character strings. Weights are assigned to character strings extracted from a homepage in a forged/falsified state or from a homepage in a normal state depending on incident history or the setting of importance levels by the user, and then resulting character strings are learned. In the present invention, the forgery/falsification of even a partial area within a homepage can also be precisely detected by comparing character strings extracted from homepage image shots.

In accordance with the present invention having the above configuration, the falsification of homepages may be detected using an image shot technique for homepages and an OCR technique for homepage image shots, thus promptly and precisely detecting not only forgery/falsification behavior on the entire homepage screen, but also forgery/falsification behavior on a partial area of the homepage difficult to detect using an existing homepage source (html) comparison technique or an existing image masking technique.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the an will appreciate that various modifications and other equivalent embodiments are possible from the embodiments. Therefore, the technical scope of the present invention should be defined by the technical spirit of the claims.

What is claimed is:

1. An apparatus for detecting forgery/falsification of a homepage, comprising:
   one or more modules being configured and executed by a processor using algorithms associated with at least one non-transitory storage device, the one or more modules comprising,
   a homepage image shot generation module configured to generate homepage image shots of an entire screen of an accessed homepage;
   a character string extraction module configured to extract character strings from each homepage image shot using an Optical Character Recognition (OCR) technique;
   a character string comparison module configured to detect whether the extracted character string is a normal character string or a falsified character string for detecting homepage forgery/falsification by comparing each of the extracted character strings with character strings required for determination of homepage forgery/falsification;
   a homepage falsification determination module configured to determine whether the corresponding homepage has been forged/falsified according to the comparison; and
   a character string learning module configured to
   compare the character strings extracted using the homepage image shot, to
   determine whether newly detected character strings are normal character strings using normality determination reference character strings based on the comparison
   classify the character strings based on the normal character strings or the falsified character strings according to the determination,
   register the character strings extracted from the corresponding homepage image shot using the OCR technique upon detection of a normal character string, and
   assign a weight to a character string repeatedly appearing with respect to the character strings extracted from previous image shots.

2. The apparatus of claim 1, wherein the character string comparison module comprises:
   a normal character string comparison module configured to compare the character string extracted from the homepage image shot with normality determination reference character strings among the character strings; and
   a falsified character string comparison module configured to compare the character string extracted from the homepage image shot with falsification determination reference character strings among the character strings.

3. The apparatus of claim 1, wherein the homepage falsification determination module is configured to:
   determine whether the corresponding homepage having been forged/falsified, in response to determination whether the character string extracted from the homepage image shot is identical to any of falsification determination reference character strings, and
   to determine whether the homepage is in as normal state in response to detection of a rate at which the character string extracted from the homepage image shot is identical to any of normality determination reference character strings is high.

4. The apparatus of claim 1, further comprising:
   a normality determination reference character string management database (DB) configured to store normal character strings that having been stored and are normality determination references, and to store normality determination reference character strings that are collected via learning, as the normal character strings; and
   a falsification determination reference character string management DB configured to store falsified character strings that having been stored and are falsification determination references, and to store falsification determination reference character strings that are collected via learning, as the falsified character strings.

5. The apparatus of claim 4, wherein the character string comparison module arranges and uses normal character strings invoked from the normality determination reference character string management DB in a comparison sequence in which weights corresponding to character strings continuously detected from at least one of existing homepages, a number of repetitions of character strings, and words designated by a user are taken into consideration.

6. The apparatus of claim 4, wherein the character string comparison module arranges and uses falsified character strings invoked from the falsification determination reference character string management DB in sequence by comparing at least one of importance levels and influence levels of homepage forgery/falsification incidents, targets of homepage forgery/falsification, presence or non-presence of specific purpose and organized behavior, character strings used in the forgery/falsification of other homepages, a number of repetitions of the character strings, and the user's character strings of interest are taken into consideration.

7. The apparatus of claim 1, wherein the character string learning module is configured to register the character string extracted from the corresponding homepage image shot using the OCR technique upon detection of a falsified character string, and to assign a weight to the registered falsified character string depending on importance levels of character strings defined by the user.

8. A method for detecting forgery/falsification of a homepage, comprising:

generating homepage image shots of an entire screen of an accessed homepage;

extracting character strings from each of the generated homepage image shots using an Optical Character Recognition (OCR) technique;

comparing each of the extracted character strings with character strings required for determination of homepage forgery/falsification for determining whether the extracted character string is a normal character string or a falsified character string;

determining whether the corresponding homepage has been forged/falsified, based on results of the comparison; and comparing the character string extracted using the homepage image shot, determining whether newly detected character strings are normal character strings using normality determination reference character strings based on the comparison, and classifying the character strings based on the normal character strings or the falsified character strings according to the determination, wherein classifying the character string comprises:

in response to determination of the corresponding homepage is in a normal state, registering the character strings extracted from the corresponding homepage image shot using the OCR technique as a normal character string, and assigning a weight to a character string repeatedly appearing with respect to the character strings extracted from previous image shots.

9. The method of claim 8, wherein comparing each of the extracted character strings comprises:

comparing the character string extracted from the homepage image shot with normality determination reference character strings among the character strings; and comparing the character string extracted from the homepage image shot with falsification determination reference character strings among the character.

10. The method of claim 8, wherein determining whether the corresponding homepage has been forged/falsified comprises:

determining whether the corresponding homepage having been forged/falsified, in response to determination whether the character string extracted from the homepage image shot is identical to any of falsification determination reference character strings, and determining whether the homepage is in a normal state in response to detection of a rate at which the character string extracted from the homepage image shot is identical to any of normality determination reference character strings is high.

11. The method of claim 8, wherein classifying the character string comprises:

in response to determination of the corresponding homepage is a forged/falsified state, registering the character string extracted from the corresponding homepage image shot using the OCR technique as a falsified character string; and assigning a weight to the registered falsified character string according to importance levels of character strings defined by the user.

* * * * *